(12) United States Patent
Hartog et al.

(10) Patent No.: US 9,094,502 B2
(45) Date of Patent: *Jul. 28, 2015

(54) INDUCED ANSWERING METHOD AND SYSTEM FOR CIRCUIT SWITCHING-BASED TELEPHONY

(75) Inventors: Jos den Hartog, SE Capelle a/d Ijssel (NL); Rogier August Caspar Joseph Noldus, Goirle (NL); Rakesh Taori, Youngtongdong (KR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 721 days.

This patent is subject to a terminal disclaimer.

(21) Appl. No.: 13/290,371

(22) Filed: Nov. 7, 2011

(65) Prior Publication Data

US 2012/0051268 A1    Mar. 1, 2012

Related U.S. Application Data

(63) Continuation of application No. 12/158,862, filed as application No. PCT/NL2005/050095 on Dec. 23, 2005, now Pat. No. 8,077,703.

(51) Int. Cl.
*H04L 12/66* (2006.01)
*H04M 1/247* (2006.01)
*H04M 3/42* (2006.01)
*H04M 7/00* (2006.01)

(52) U.S. Cl.
CPC ........ *H04M 1/2471* (2013.01); *H04M 3/42059* (2013.01); *H04M 7/0039* (2013.01); *H04M 2203/2033* (2013.01); *H04M 2203/257* (2013.01)

(58) Field of Classification Search
None
See application file for complete search history.

(56) References Cited

U.S. PATENT DOCUMENTS

| | | | |
|---|---|---|---|
| 6,320,862 B1 * | 11/2001 | Nitta | 370/401 |
| 7,116,646 B1 * | 10/2006 | Gustafson et al. | 370/313 |
| 7,508,816 B1 * | 3/2009 | Everson et al. | 370/352 |
| 7,684,383 B1 * | 3/2010 | Thompson et al. | 370/352 |
| 8,077,703 B2 * | 12/2011 | Hartog et al. | 370/352 |
| 2004/0247096 A1 * | 12/2004 | Nakatsu | 379/88.18 |
| 2005/0031095 A1 * | 2/2005 | Pietrowicz | 379/88.18 |
| 2005/0152347 A1 * | 7/2005 | Chen et al. | 370/356 |
| 2005/0260975 A1 * | 11/2005 | Chen et al. | 455/415 |
| 2006/0025158 A1 * | 2/2006 | Leblanc et al. | 455/456.2 |
| 2006/0043164 A1 * | 3/2006 | Dowling et al. | 235/375 |
| 2006/0126816 A1 * | 6/2006 | Shaffer et al. | 379/265.02 |
| 2006/0159059 A1 * | 7/2006 | Vaittinen et al. | 370/347 |
| 2008/0058003 A1 * | 3/2008 | Rydnell et al. | 455/552.1 |
| 2008/0279351 A1 * | 11/2008 | Koch | 379/88.14 |
| 2008/0316998 A1 * | 12/2008 | Procopio et al. | 370/352 |
| 2014/0161033 A1 * | 6/2014 | Dowling et al. | 370/328 |

* cited by examiner

*Primary Examiner* — Phirin Sam

(57) ABSTRACT

A user terminal in a telecommunications network includes a circuit-switched (CS) telephony device and a packet-switched (PS) data processing device. The CS telephony device receives a CS-alert signal from the network for an incoming CS call and derives from the CS-alert signal that an associated PS signal is to be expected within a predetermined time interval. The terminal postpones generation of a call-received alarm for a user during the predetermined time interval. The PS data processing device receives the associated PS signal within the predetermined time interval, wherein the PS signal includes a request that the user terminal automatically answer the incoming CS call. In response to the request, the PS data processing device passes a control signal to the CS telephony device causing the CS telephony device to switch to an automatic answering mode and transmit a CS-answer signal to the network without input from the user.

12 Claims, 6 Drawing Sheets

Prior Art

INDUCED ANSWERING METHOD AND SYSTEM FOR CIRCUIT SWITCHING-BASED TELEPHONY

RELATED APPLICATIONS

This application is a continuation of co-pending U.S. patent application Ser. No. 12/158,862 filed Dec. 3, 2008 now U.S. Pat. No. 8,077,703, which is a 371 of International Application No. PCT/NL2005/050095, filed Dec. 23, 2005, the disclosures of which are fully incorporated herein by reference.

FIELD OF THE INVENTION

The present invention relates to a user terminal as defined in claim 1. Also, the present invention relates to a method for answering CS-based telephony. Moreover, the present invention relates to a network exchange (or network service or network application server) and to a call-initiating terminal.

The present invention also relates to a computer program for a user terminal.

BACKGROUND OF THE INVENTION

In circuit-switched (CS) telephony, a set-up of a call between parties comprises a number of steps. A call is initiated by a first party A, who dials on his A-terminal a telephone number of a B-terminal of second party B. Then, the telephony network routes the call to the B-terminal by using the information of the dialed telephone number. Next, the call is announced to party B by a signal generated on the B-terminal. Then, the B-party can answer the call by some interaction with the B-terminal. The B-terminal signals the network that the call is accepted. After the answer generated by the B-terminal, the call is connected between the A-terminal and the B-terminal and a speech communication between parties A and B is established.

This set-up of a call is implemented in both the wired and the mobile network. Both the A-terminal and B-terminal may be a wired or mobile telephone.

From the prior art a specification for mobile CS-telephony is known (GSM TS04.07 version 7.3.0, chapter 6.2) which describes a sequence of states of a finite state machine of a telephone device during set-up, progress and termination of a call. FIG. 1 shows a part of the CS-call state diagram 1 from the prior art.

The finite state machine of the telephone (B-terminal) can be in a number of various states. Normally, when the telephone is idle and not in communication, the state of the telephone is the "null" state 10.

From the network as an incoming signal a call request by the A-terminal may be received. Due to this signal, the finite state machine changes its state to a "call received" state 20. The finite state machine arrives at the "call received" state 20 through some intermediate state(s) 15. In this state the user (party B) of the B-terminal is notified of the incoming call. Due to a user generated answer, e.g. pressing an "acknowledge" key on the keypad of the B-terminal, the finite state machine changes to an active state 30, in which speech communication between the party A of the A-terminal and the party B of the B-terminal can be executed. The action of a user generated answer to the incoming call is schematically indicated by block A1, connected by a dotted arrow-line to the "call received state" 20.

The finite state machine arrives at the "active" state 30 through an intermediate state 25. At the same time, a CS-call answer signal is returned to the exchange to establish the speech communication phase.

Upon termination of the call, the finite state machine changes to the "null" state 10, possibly through some further intermediate state(s) 35. At this time, termination of the call is indicated to the exchange.

In the prior art, the party B is required to activate the B-terminal by performing some manipulation of the B-terminal, e.g., by pressing some "acknowledge" button on the terminal.

The above mentioned method of answering the incoming call adversely restricts the usability and functionality of the telephone, i.e., the method of the prior art may limit user-directed services.

SUMMARY OF THE INVENTION

It is an object of the present invention to provide a terminal which has improved answering capabilities in view of the prior art.

To solve this object, the present invention provides a user terminal for communication over a telecommunications network comprising at least a CS-telephony device for processing CS-based telephony signals, the CS-based telephony signals being received and transmitted over a circuit switched bearer service; the user terminal being arranged for receiving an additional answer-related signal, the additional answer-related signal being associated with an incoming CS-alert signal of an incoming call;

the user terminal being arranged for transmitting a response signal or CS-answer signal over the circuit switched bearer service in response to information comprised in, or derived from, the additional answer-related signal.

Advantageously, the present invention provides a possibility for automatic answering an incoming call on the user terminal, which does not require a user interaction.

Also, the present invention relates to a network service on a telecommunications network comprising at least a circuit switched bearer service for receiving and transmitting CS-based telephony signals; the circuit switched bearer service being arranged for sending an CS-alert signal of an incoming call to a user terminal; the network service being arranged for sending an additional answer-related signal to the user terminal, the additional answer-related signal being associated with the CS-alert signal of the incoming call and being arranged for causing the user terminal to provide a response signal or CS-answer signal over the circuit switched bearer service.

Moreover, the present invention relates to a call initiating terminal or A-terminal for communication over a telecommunications network comprising a CS-telephony device for processing CS-based telephony signals, the CS-based telephony signals being received and transmitted over a circuit switched bearer service; the call initiating terminal being arranged for transmitting an additional answer-related signal being associated with a transmitted CS-call setup signal for an outgoing call with a user terminal, the additional answer-related signal comprising information on the outgoing call, which causes the receiving user terminal to provide a response signal or CS-answer signal over the circuit switched bearer service.

Furthermore, the present invention relates to a method for communication over a telecommunications network comprising:

processing CS-based telephony signals, the CS-based telephony signals being received and transmitted over a circuit switched bearer service;

receiving an additional answer-related signal being associated with an incoming CS-alert signal of an incoming call;

transmitting a response signal or CS-answer signal over the circuit switched bearer service in response to information comprised in, or derived from, the additional answer-related signal.

Also, the present invention relates to a computer program for a user terminal for communication over a telecommunications network (3), the user terminal comprising at least a CS-telephony device for processing CS-based telephony signals, the CS-based telephony signals being received and transmitted over a circuit switched bearer service; wherein the user terminal further comprises a processing unit and memory, the memory being coupled with the processing unit, the computer program after being loaded, enabling the processing unit to control the following functions of the user terminal:

receiving an additional answer-related signal associated with an incoming CS-alert signal of an incoming call;

transmitting a response signal or CS-answer signal over the circuit switched bearer service in response to information comprised in, or derived from, the additional answer-related signal.

BRIEF DESCRIPTION OF DRAWINGS

The invention will be explained in more detail below with reference to a few drawings in which illustrative embodiments of the invention are shown. It will be appreciated by the person skilled in the art that other alternative and equivalent embodiments of the invention can be conceived and reduced to practice without departing from the true spirit of the invention, the scope of the invention being limited only by the appended claims.

Throughout the figures entities with the same reference number refer to identical entities as shown in the other figures.

DESCRIPTION OF EMBODIMENTS

Figure 2:
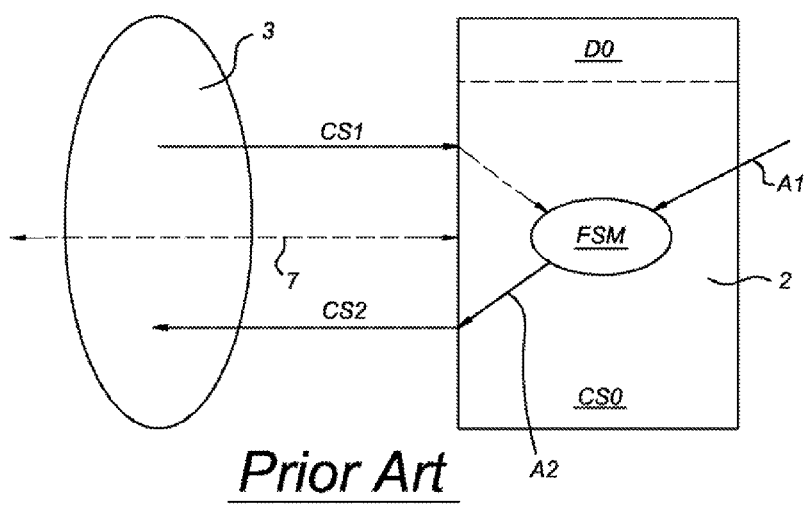
FIG. 2 shows schematically answering procedures in a terminal from the prior art.

FIG. 2 shows schematically an answering procedure in a terminal 2 from the prior art.

The terminal 2 is typically a mobile telephone but may also be a wired telephone. The terminal 2 is arranged for communication over a telecommunications network 3.

The terminal 2 as an electronic device comprises a CS-telephony device CS0 which is arranged for processing CS-based telephony signals. CS-based telephony signals may be implemented, for example, by means of the DTAP protocol (Direct Transfer Application Part) as used in GSM (Global System for Mobile communications). Further, the terminal 2 may comprise a further device D0 which may be arranged for providing a graphical user interface (GUI) and for providing execution of one or more applications which may be executed locally, and possibly but not necessarily within the GUI. The further device D0 typically comprises memory for storing data and/or applications.

In the CS-telephony device CS0 a finite state machine FSM is present which is capable of managing CS-based telephony functions.

Figure 1:
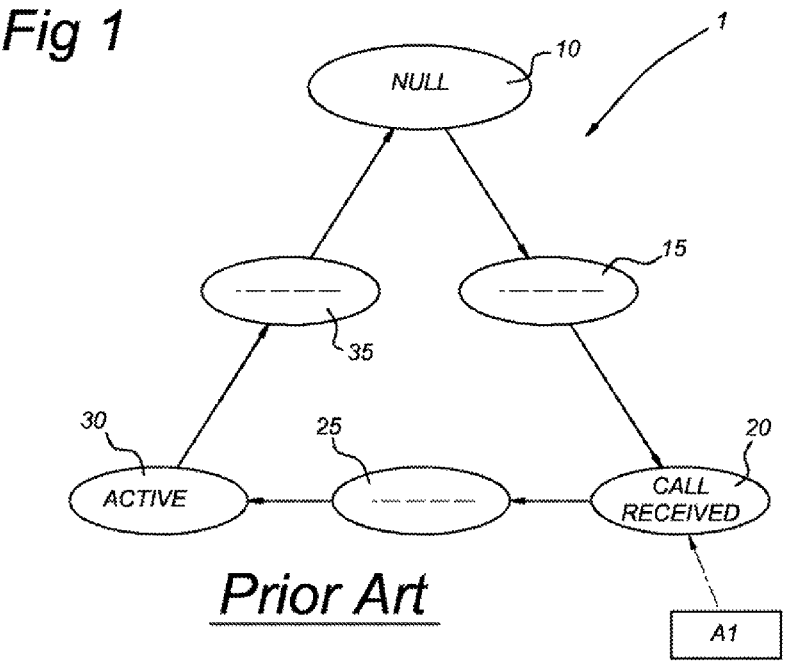
FIG. 1 shows a part of a CS-call state diagram from the prior art.

The answering procedure shown for the terminal 2 corresponds with the CS-call state diagram of FIG. 1.

From the network 3 a CS alert signal CS1 is provided to the terminal 2 to indicate a call-request for an incoming call. As described above with reference to FIG. 1, the finite state machine FSM provides a notification of the incoming call to the user of the terminal 2.

The user responds by some action e.g. pressing an "acknowledge" button, depicted here as an action signal A1.

The signal A1 from the user action is provided to the finite state machine FSM. The finite state machine FSM now prepares for speech communication in "active" state 30 by an acceptance signal A2. At this time, a CS-based answer signal CS2 is sent to the network 3 to indicate the call is being answered and a speech communication 7 is opened with the call initiating terminal or A-terminal (not shown).

Figure 3:
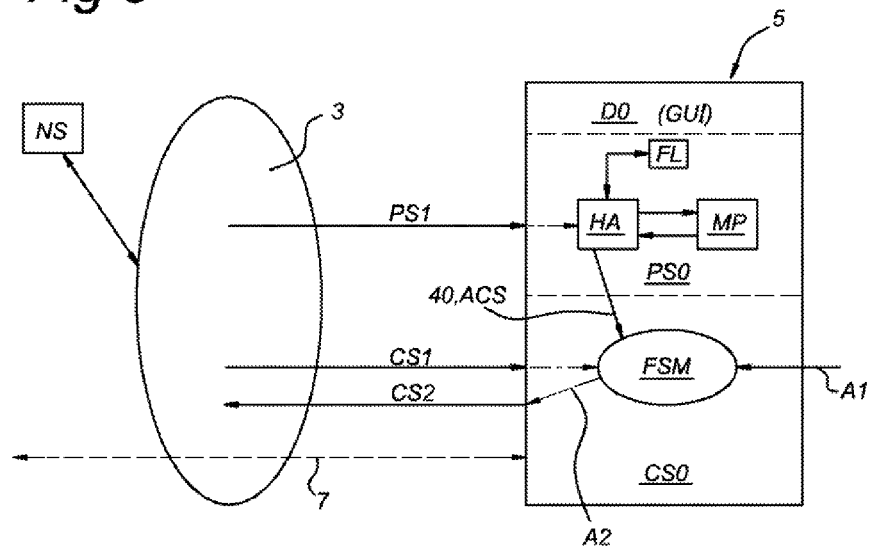
FIG. 3 shows schematically a terminal capable of using the answering method according to the present invention.

FIG. 3 shows a user terminal 5 in accordance with the present invention.

In FIG. 3 entities with the same reference number refer to identical entities as shown in the preceding figures.

In the present invention it is recognized that an automatic answer may be provided by a user terminal 5 when in relationship with the CS alert signal CS1 an additional packet switched signal PS1 of a packet switched network source (on the network 3) is provided to the user terminal 5 of the present invention.

The user terminal 5 of the present invention comprises electronic circuitry in which the CS-telephony device CS0 and a packet switched data processing device PS0 reside. Devices CS0 and PS0 are schematically depicted by dashed-line rectangles. Further, the user terminal 5 may comprise the further device D0 as described above which may be arranged for providing a graphical user interface (GUI) and (locally executable) applications related to the GUI.

Packet switched signals PS1 are, for example, implemented by means of the Internet Protocol (IP).

Within the CS-telephony device CS0 the finite state machine FSM is located.

Within the packet switched data processing device PS0 a processing application HA for processing a packet switched signal is located. Also, a storage device or memory MP for storing data relating to the additional packet switched signal PS1 may be located here.

The processing application HA has an output which is in connection 40 to the finite state machine FSM for transmitting information signals from the processing application HA to the finite state machine FSM. The processing application is capable of deriving information from the additional packet switched signal PS1. Such information signals comprise at least an answering control signal ACS.

The finite state machine FSM is capable of changing its state in relation to the answering control signal ACS received from the processing application HA, as will be explained in more detail below.

A network service (or network application server) NS on the network 3 is capable of providing the CS alert signal CS1 in combination with the additional packet switched signal PS1 to the user terminal 5.

Within the network 3 the signals CS1 and PS1 are transmitted over their respective bearer services. The CS-alert signal CS1 is transmitted over a first circuit-switch based bearer service. The packet switched signal PS1 is transmitted over a second packet-switch based bearer service.

The CS alert signal CS1 is guided to the CS-telephony device CS0. The CS alert signal CS1 will have an interaction with the finite state machine FSM as described above with reference to FIGS. 1 and 2. The finite state machine FSM will change its state to the call received state 20 (if not busy).

The finite state machine FSM is arranged to expect an additional packet switched signal PS1 in conjunction with the receipt of the CS-alert signal CS1. In one embodiment, the finite state machine FSM derives from the CS-alert signal CS1 that such an additional packet switched signal PS1 is to be expected. For example, this can be based on the received Caller Line Identity signal or a modification of the CS-alert signal CS1. The received Caller Line Identity signal or modification of the CS-alert signal CS1 may be compared to some stored data in the memory MP to determine if the CS-alert signal relates to a relevant network service and if a related additional packet switched signal PS1 can be expected. In another embodiment, the finite state machine FSM may be arranged to expect to receive a related additional packet switched signal PS1 within a (fixed) predetermined interval of time. While expecting the additional packet switched signal PS1, the finite state machine FSM may be arranged to postpone generation of an alarm (audible, visible or tactile) for the user. The predetermined interval of time may be such that the CS-alert signal CS1 and the packet switched signal PS1 are received substantially simultaneously at the user terminal 5.

Also, it is feasible that the packet switched signal PS1 arrives before the CS-alert signal CS1, but is withheld until arrival of the corresponding CS-alert signal CS1.

After receipt, the additional packet switched signal PS1 is guided to the processing application HA in the packet switched data processing device PS0. The additional packet switched signal PS1 contains at least answering-related data that relate to the "ongoing" CS alert signal CS1. The processing application HA is arranged to determine from the answering-related data in the packet switched signal PS1 if the network service requests that an automatic answer by the user terminal 5 is executed.

If an automatic answer is requested the processing application HA may provide the answering control signal ACS over the connection 40 to the finite state machine FSM.

Upon receipt of the answering control signal ACS, the finite state machine FSM changes it's state by transition from the "call received" state 20 through the intermediate state 25 to the "active" 30 state.

By consequence, the user terminal 5 provides the CS-answer signal CS2 to the network 3 that the pending call is answered. Speech communication 7 can be initiated.

In the manner as described above the additional packet switched signal PS1 provides a network induced answer for the CS-telephony based device CS0.

In accordance with the present invention, the transition from the "call received" state 20 to the "active" state 30 is triggered by a network induced answer (provided by the additional packet switched signal PS1) or by call acceptance by the mobile terminated user of the user terminal 5.

The sequel of the established call may be as described above with reference to FIGS. 1 and 2.

Figure 4:
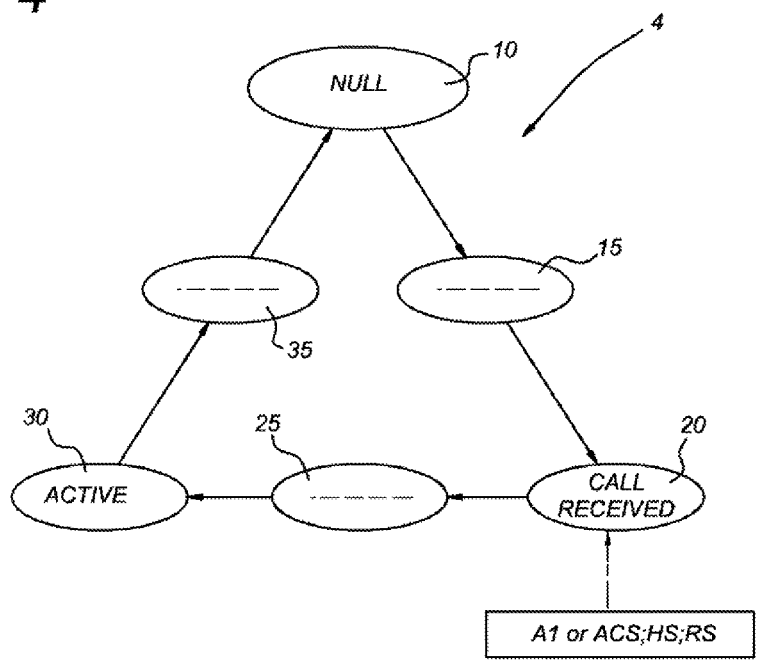
FIG. 4 shows a CS-call state diagram in accordance with the present invention.

FIG. 4 shows a CS-call state diagram 4 for the finite state machine of the user terminal 5 in accordance with the present invention.

The finite state machine FSM of the user terminal 5 is very similar to the finite state machine of the prior art, except that additionally the finite state machine FSM is capable of accepting a primitive ACS in the CS-call state. Primitive ACS is derived from the answering control signal ACS that was generated by the processing application HA. The primitive ACS may influence (dotted line) the finite state machine FSM to change the state from "call received" state 20 to the "active" 30 state.

The step of determining by the processing application HA that an automatic answer by the user terminal 5 is to be executed requires that the CS-alert signal CS1 and the additional packet switched signal PS1 are correlated in some way. For example, the additional packet switched signal PS1 may contain data that relate to the CS-alert signal CS1, such as the Calling Line Identity (CLI) of the party A which typically is included in the CS-alert signal CS1. Also, the CS-alert signal CS1 may contain some data to indicate that the additional packet switched signal PS1 will be sent along.

Moreover, from the additional packet switched signal PS1 the processing application may derive an identification of the network service NS that sent the combined CS-alert signal CS1 and the additional packet switched signal PS1.

Further, from the additional packet switched signal PS1 the processing application may derive authentication information about the network service NS, which enables the processing application HA to check the authentication of the network service NS. In this manner, the user of the user terminal 5 can be sure of the identity of the network service 3.

Finally, the data of the additional packet switched signal PS1 may contain additional information which indicates the "reason" that the network service NS requests the call to be answered automatically by the user terminal 5.

The information comprised in the signal PS1 for at least one of identification, authentication and "reason" allows the processing application HA to apply a services filter FL on which network services are allowed to be answered automatically.

The services filter FL comprises data that are associated with the above mentioned information within the additional packet switched signal PS1 for identification and/or for authentication purposes of the network service NS that transmitted or generated the signal PS1.

The services filter FL may be user-defined by means of e.g., an (possibly GUI-based) application on the user terminal 5. A user may use the application to define one or more network services NS for which he/she allows the user terminal 5 to automatically answer an incoming call. The application is capable of defining services filtering data which are accessible by the processing application HA for use during the process of determining if an automatic answer may be generated for an incoming call. The services filtering data are typically stored in a memory associated with the services filter FL.

In one embodiment, the user terminal 5 is arranged to process both the CS-alert signal CS1 and the additional packet switched signal PS1 automatically, without notifying the user about the incoming message (i.e., have a silent alerting pattern). Carrying out this process may be for example be done by using applications for mobile terminals such as SIM Application Toolkit (SAT) and MExE. The processing application HA may use an application programming interface such as J2ME. The skilled person will however appreciate that alternative protocols and programming environments may be equally suitable.

Depending on the actual nature of the incoming call (and its reliability), the present invention may allow the combination of CS-alert signal CS1 and additional packet switched signal PS1 to be generated by either the network service NS or the A-terminal of party A.

Figure 5:
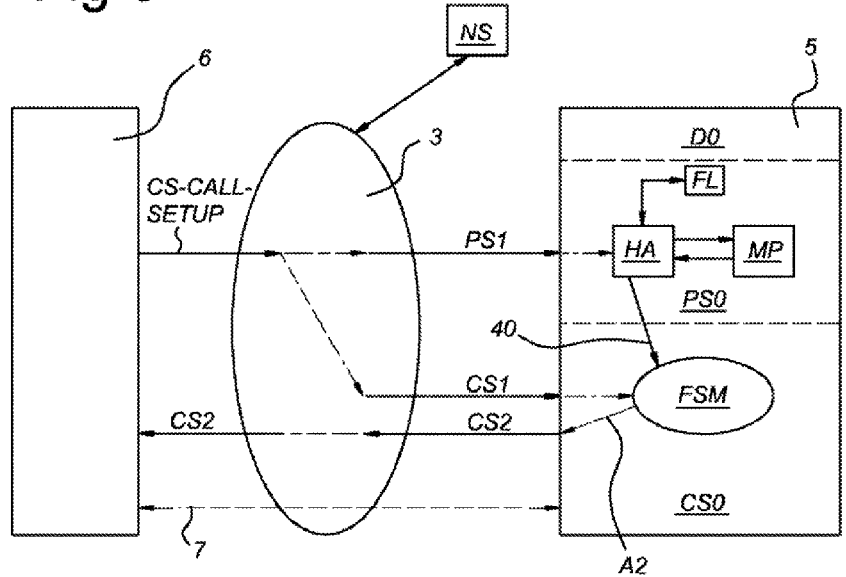
FIG. 5 shows a signal flow in accordance with the answering method of the present invention.

FIG. 5 shows a signal flow in accordance with the answering method of the present invention.

In this embodiment, the combination of CS-alert signal CS1 and additional packet switched signal PS1 is generated by the network service NS on the network 3.

The call-setup is initiated by an A-terminal 6, which transmits CS-alert signal (or in general, a CS-call setup) CS1 to the network 3. In the network 3 a network service NS generates the additional packet switched signal PS1, which is transmitted to the user terminal 5 (or B-terminal 5, not shown in detail) in combination with the CS-alert signal CS1. As mentioned above, the CS-alert signal CS1 may be altered in that a silent alerting pattern is sent to the user terminal 5.

As explained before, the user terminal 5 will generate an automatic answer (CS answer CS2) based on the information received in the combination of CS-alert signal CS1 and additional packet switched signal PS1. The CS answer CS2 is transmitted to the network 3 and the A-terminal 6 to establish a speech communication 7.

Figure 6:
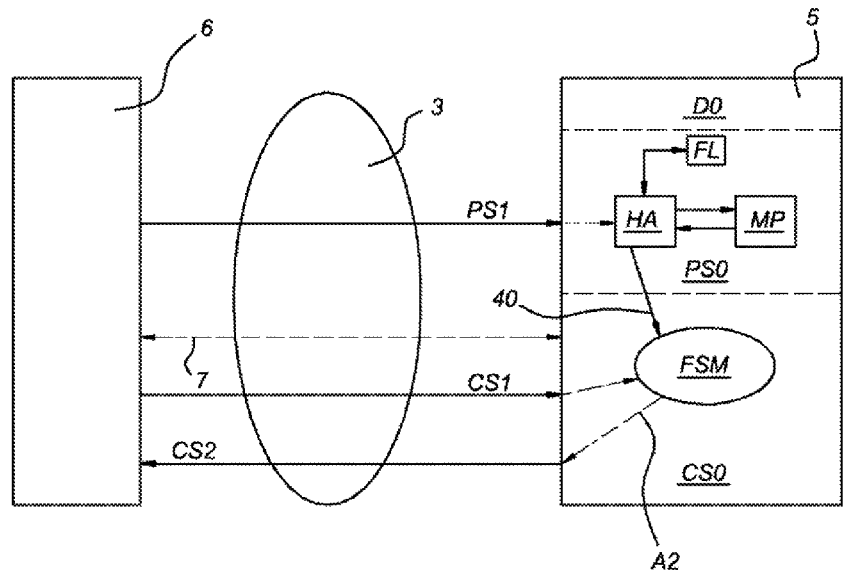
FIG. 6 shows a further signal flow in accordance with the answering method of the present invention.

FIG. 6 shows a further signal flow in accordance with the answering method of the present invention.

In this embodiment, the combination of CS-alert signal CS1 and additional packet switched signal PS1 is generated by the A-terminal 6.

The CS-alert signal CS1 and the additional packet switched signal PS1 are both generated by an A-terminal 6 and transmitted over the network 3 to the user terminal 5. The network 3 in this case appears transparent for both the CS1 and PS1 signals. It is noted that the CS-call-setup or CS-alert signal CS1 generated by the A-terminal 6 may comprise a silent alerting pattern.

As explained before, the user terminal 5 will generate an automatic answer (by means of CS answer CS2) based on the information received in the combination of CS-alert signal CS1 and additional packet switched signal PS1. The CS answer CS2 is transmitted to the network 3 and to the A-terminal 6 to establish speech communication 7.

Figure 7A:
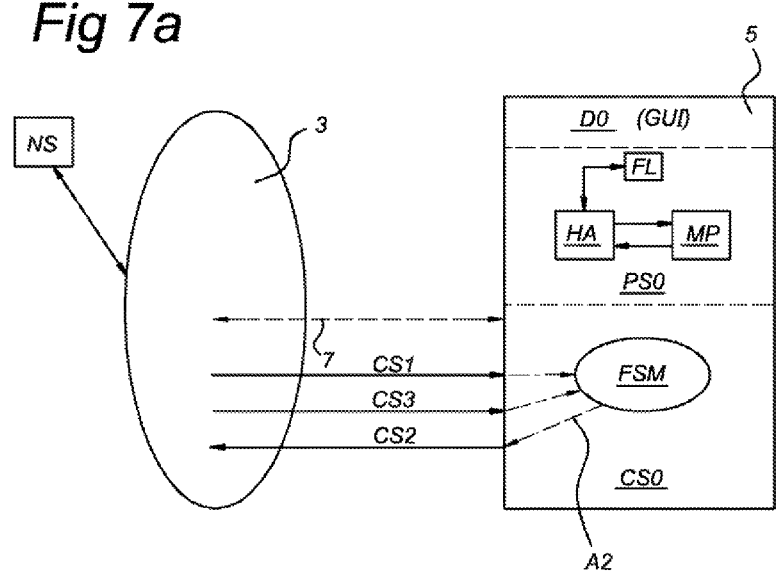
FIGS. 7a, 7b, 7c show still further signal flows in accordance with the answering method of the present invention.
Figure 7B:
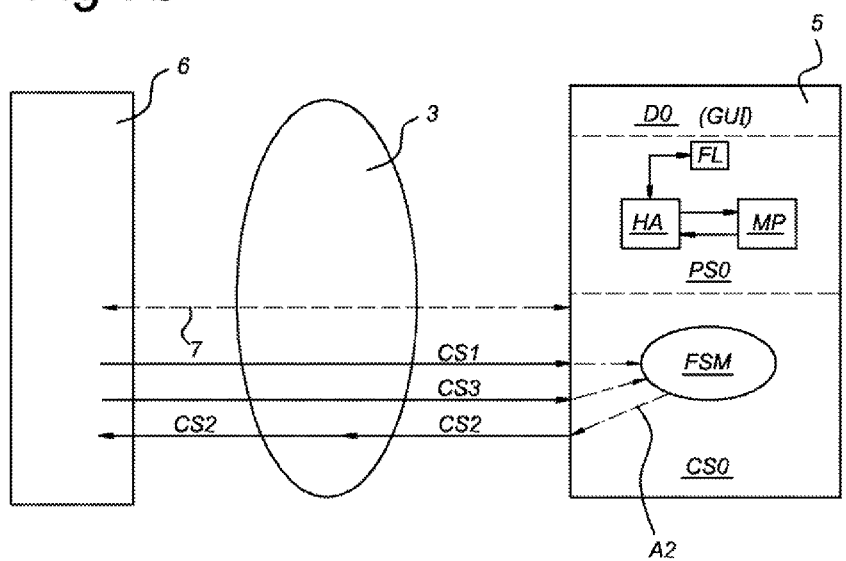
Figure 7C:
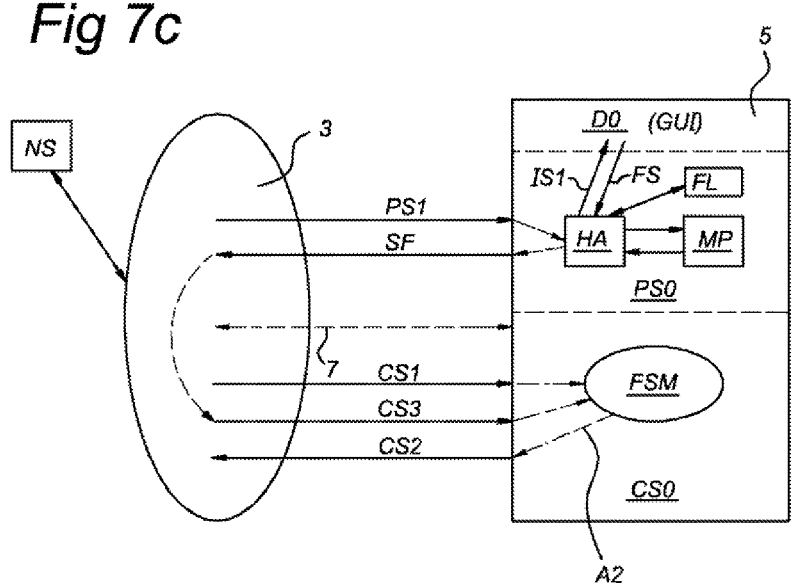

FIGS. 7a, 7b 7c shows still further signals flow in accordance with the answering method of the present invention.

In the embodiment of FIG. 7a, the user terminal 5 receives an incoming call with a CS-alert signal CS1 in combination with an additional circuit switched signal CS3 from a network service NS on network 3.

A network service NS generates the CS-alert signal CS1 and, in addition, a network-induced answer signal CS3.

The network-induced answer signal CS3 is a signal in the CS-domain.

The CS alert signal CS1 is guided to the CS-telephony device CS0. The CS alert signal CS1 will have an interaction with the finite state machine FSM as described above with reference to FIGS. 1 and 2. The finite state machine FSM will change its state to the "call received" state 20 (if not busy).

The finite state machine FSM is arranged to expect the additional circuit switched signal CS3 in conjunction with the receipt of the CS-alert signal CS1. The finite state machine FSM is arranged to derive from the CS-alert signal CS1 that such an additional network-induced answer signal as CS3 is to be expected.

While expecting the additional circuit switched signal CS3, the finite state machine FSM may be arranged to postpone generation of an alarm (audible, visible or tactile) for the user for a predetermined interval of time in which the additional circuit switched signal (or network-induced answer signal) CS3 may be received at the user terminal 5.

Also, it is feasible that the additional circuit switched signal CS3 arrives before the CS-alert signal CS1, but is withheld until arrival of the corresponding CS-alert signal CS1.

After receipt, the additional circuit switched signal CS3 is also guided to the finite state machine FSM. The additional circuit switched signal CS3 may contain at least answering-related data that relate to the "ongoing" CS alert signal CS1.

The finite state machine FSM may be arranged to determine from the additional circuit switched signal CS3 if the network service requests that an automatic answer by the user terminal 5 is executed.

If an automatic answer is requested, the finite state machine FSM changes it's state by transition from the "call received" state 20 through intermediate state(s) 25 to the "active" 30 state, and transmits the CS answer CS2 to the network 3 (network service NS).

Next, speech communication 7 can be initiated.

In the embodiment of FIG. 7a, the user terminal 5 receives an incoming call with a CS-alert signal CS1 in combination with an additional circuit switched signal CS3 from a network service NS on network 3.

A network service NS generates the CS-alert signal CS1 and, in addition, the additional circuit switched signal CS3, both transmittable over the circuit switched bearer service.

In the embodiment of FIG. 7b, the user terminal 5 receives an incoming call with a CS-alert signal CS1 in combination with an additional circuit switched signal CS3 from a call initiating A-terminal 6.

The A-terminal 6 which initiates the incoming call for the user terminal 5 generates the CS-alert signal CS1 and, in addition, the additional circuit switched signal CS3, both over the circuit switched bearer service.

The network 3 in this case appears transparent for both the CS1 and CS3 signals. It is noted that the CS-call-setup or CS-alert signal CS1 generated by the A-terminal 6 may comprise a silent alerting pattern.

Again, as described above with reference to FIG. 7a, the finite state machine FSM is arranged for determining from the network-induced answer signal CS3 if the network service requests that an automatic answer by the user terminal 5 is executed.

If so, the finite state machine can change it's state by transition from the "call received" state 20 through the intermediate state(s) 25 to the "active" 30 state, and transmit the CS answer CS2 to the network 3 (and the A-terminal 6). Next, speech communication 7 between A-terminal 6 and user terminal 5 can be initiated.

In the embodiment of FIG. 7c, the user terminal 5 receives an incoming call with a CS-alert signal CS1 in combination with an additional packet switched signal PS1 which comprises an invitation signal IS1.

The additional packet switched signal PS1 over the packet switched bearer service may be generated by a network service NS or by a call initiating A-terminal 6 as explained above with reference to FIG. 5 and FIG. 6, respectively.

The processing application HA is arranged to extract the invitation signal IS1 from the additional packet switched signal PS1 and to transmit the invitation signal IS1 to the further device D0. The further device D0 is arranged for processing the invitation signal IS1 by some GUI based application, which now presents information related to the incoming call to the user. After receiving a feed-back signal FS for this information from the user, the user terminal transmits the (information related to the) feed-back signal SF in packet switched format back to the network service NS over the PS bearer service.

The network service NS is arranged for recognizing the feed-back signal from the user terminal 5. Accordingly, the network service NS now responds by sending a induced CS-answer signal CS3 over the circuit switched bearer service to the user terminal 5 to inform it CS0 about the user interaction with packet switched signal PS1, comprising the invitation signal IS1. The finite state machine FSM receives the network-induced CS-answer CS3 and changes it's state to the "active" state 30. Accordingly, the CS-telephony based device CS0 transmits a CS answer CS2 to the network 3 (network service NS and/or A-terminal 6).

If required, speech communication 7 may now be established.

Figure 8:
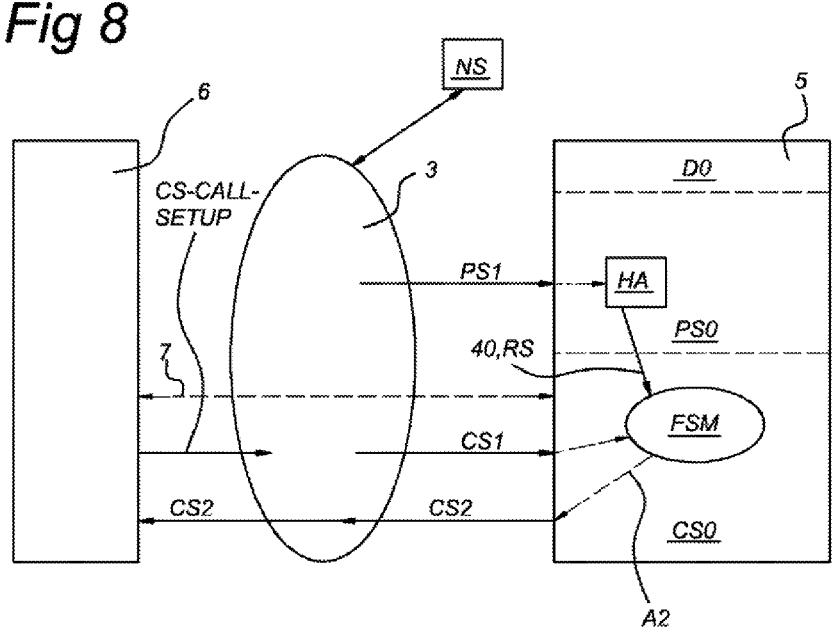
FIG. 8 shows a signaling diagram for a further embodiment of the answering method of the present invention.

FIG. 8 shows a signaling diagram for a further embodiment of the answering method of the present invention.

In this embodiment similar to the embodiment shown in FIG. 5, the combination of CS-alert signal CS1 and additional packet switched signal PS1 is generated by the network service NS on the network 3.

The call-setup is initiated by an A-terminal 6, which transmits a CS-alert signal CS1 to the network 3. In the network 3 a network service NS generates the additional packet switched signal PS1 over the packet switched bearer service, which is transmitted to the user terminal 5 (or B-terminal 5, not shown in detail) in combination with the CS-alert signal CS1. As mentioned above, the CS-alert signal CS1 may be altered in that a silent alerting pattern is sent to the user terminal 5.

The additional packet switched signal PS1 comprises a ring-delay signal RS which contains information on a number of rings or time interval before the automatic CS-answer CS2 is to be transmitted to the network 3. The processing application HA processes the additional packet switched signal PS1 and extracts the ring-delay signal RS information. Through the connection 40 the processing application HA sends (the information relating to) the ring-delay signal RS to the finite state machine FSM which determines from the received ring information after how many rings (or when) to change from the "call received" state 20 to the "active state" 30 and to transmit the CS-answer signal CS2 to the network 3.

As explained before, the CS-answer CS2 is transmitted to the network 3 and the A-terminal 6 to establish a speech communication 7.

Figure 9:
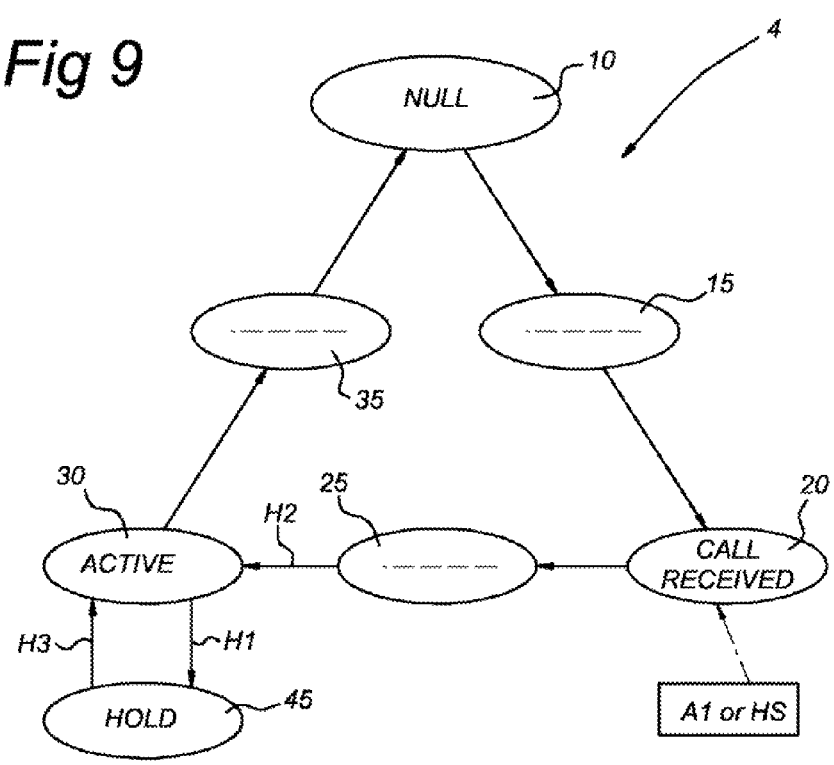
FIG. 9 shows a CS-call state diagram in a further embodiment of the answering method of the present invention.

FIG. 9 shows a CS-call state diagram in a further embodiment of the answering method of the present invention.

In this embodiment of the invention, the user terminal 5 has given privilege to the A-terminal 6 to "break-in" into a conversation during a possibly ongoing first other call between the user terminal 5 and another A-terminal. In this situation, the present invention may provide a "(network-induced) forced call hold" as explained below.

The principle of "call hold" is described in GSM TS04.83 v. 7.0.1. Chapter 2.1.5 of GSM TS04.83 describes states for "call hold". The "call hold" states are considered in this document as auxiliary states, that are part of the general "active" state 30.

The privileged A-terminal 6 sets up a call to the user terminal 5 and includes a "forced call hold" instruction in the call set up, or a network service NS may provide the "forced hold instruction" on behalf of the privileged A-terminal 6. This "forced call hold" instruction is transported as the additional packet switched signal PS1 through the bearer service in the PS domain. This "forced call hold" instruction may have the effect that when received by the user terminal 5, the processing application HA provides a hold signal or hold primitive HS over connection 40 to the finite state machine FSM.

Depending on the actual state of the user terminal 5 when the call of the privileged A-terminal comes in, i.e., the "null" state 10 (=idle) or the "active" state 30 (=busy), the finite state machine FSM may interpret the hold signal HS differently.

During the "null" state 10, the finite state machine FSM will change it's state to the "call received" state 20 (as described above) and may ignore the "hold" signal (In this case, the incoming call can be handled by the party B as a normal call from the prior art). Alternatively, in accordance with one or more of the embodiments as described above, the finite state machine FSM may interpret the "hold" signal HS as a network induced instruction for automatically answering the incoming call and change to the "active" state 30.

However, when the hold signal comes in at the finite state machine FSM during an "active" state of the first other call, the finite state machine FSM is arranged to change the state for that first other active call to a "hold" state 45 (change indicated by arrow H1), and change the state of the incoming call from the privileged A-terminal 6 to the "active" state (arrow H2).

After termination of the call from the privileged A-terminal 6, the finite state machine restores it's state to the preceding state: the first other call on "hold" (in the "hold" state) is retrieved and restored to the "active" state (arrow H3), or if no other call was present the state is changed to the "null" state.

Note that both the transfer (H1) of the other call from the "active" state 30 to the "hold" state 45 and the restoration (H3) of the other call from the "hold" state 45 to the "active" state 30 may, per se, be carried out in accordance with the GSM TS04.83 specification. The additional packet switched signal PS1 (a network-induced signal) in accordance with the present invention instructs the user terminal 5 to carry out either of both actions H1, H3.

The inclusion of the "forced call hold" may be done manually by party A. Alternatively, including the "forced call hold" may be done automatically by the A-terminal 6 by some recognition procedure for the B-number of the user terminal 5.

For example, the B-number of the user terminal 5 and an indication for application of "forced call hold" for that B-number may be stored in a memory of the A-terminal. When the B-number of the user terminal 5 is called, the A-terminal may use the data stored in the memory to transmit the "forced call hold" instruction automatically.

Furthermore, the additional information (of the "forced call hold" instruction) in the additional packet switched signal PS1 can contain references to announcements (audible on a speaker or visible on a display of the respective terminals) that must be presented to the user terminal 5 and/or the other A-terminal in the first other call.

For example, the party of the other A-terminal that is going to be placed on "hold" may receive an appropriate announcement and the party B of the user-terminal 5 that is going to be automatically through-connected with the party of the privileged A-terminal 6 may receive an appropriate announcement. These announcements may differ from one another. The announcements may be provided by a network service NS in response to an announcement signal in the PS domain from the user terminal 5.

The additional information in the additional packet switched signal PS1 can also indicate to the B party's user terminal 5 that the network-induced "forced call hold" should occur after a defined number of rings (e.g. 3 rings). That enables the party B to answer the phone by itself, instead of "having it answered".

Network-induced "call hold" can be a good extension to an application of providing spoken content during route navigation via the mobile phone while driving. When a driver expects route information (e.g. "next exit on the highway"), he also expects to receive this information in the case that he has an ongoing phone conversation. So, the spoken route information must automatically put the ongoing conversation on hold, possibly play the announcement(s), disconnect, and restore the original conversation.

It is noted that the method for the user terminal 5 according to the present invention may be implemented in hardware and/or software. In case of software the user terminal 5 comprises a processing unit and memory, the memory being coupled with the processing unit. The user terminal 5 is capable of loading a computer program which implements the method as described above. After loading of the computer program, the processing unit of the user terminal 5 is arranged for executing the program so as to obtain the functionality as described above.

Similarly, software programs may be used within the network service 3 and/or the call initiating A-terminal 6 in order to obtain the functionalities as described above with reference to the network service NS and the A-terminal 6, respectively.

The present invention can also be implemented in a variety of applications for the user terminal 5.

In a first CS-based application the user terminal 5 is arranged for receiving spoken content of a guided tour. The user terminal 5 may be any suitable mobile communication device in accordance with any one of the embodiments.

Each time when new content becomes available (e.g. in reaction to a location of the user terminal 5) the CS-based application initiates a call to the user terminal 5 by means of the additional packet switched signal PS1. Each call is automatically answered without interaction by the user, in accordance with one or more of the embodiments described above.

In another application, the user terminal 5 is arranged to have a function of a babyphone. The user terminal 5 may be located in a room with a child for example, a baby or toddler. Any call to the user terminal 5 results in a connection for recording sound from the room. The call contains the additional packet switched signal PS1 for automatically answering the call, and may also contain an instruction for a silent alerting pattern.

The babyphone can be embodied by any one of the embodiments of a user terminal as described above, in which the user terminal is arranged for communication over a telecommunications network which comprises at least a CS-telephony device CS0 for processing CS-based telephony signals CS1, CS2, the CS-based telephony signals being received and transmitted over a circuit switched bearer service. The user terminal is arranged for receiving an additional answer-related signal PS1; CS3, with the additional answer-related signal being associated with an incoming CS-alert signal CS1 of an incoming call. Further, the user terminal is arranged for transmitting a response signal or CS-answer signal CS2 over the circuit switched bearer service in response to information comprised in, or derived from, the additional answer-related signal.

In a further application, the present invention provides the network-induced call hold as described above. An A-terminal 6 calls the user terminal 5 of the present invention. The user terminal is busy in a call to another terminal. The A-terminal 6 is privileged to "break in" in the ongoing call as explained before. The user of the A-terminal receives the "busy" signal and may by giving an instruction on the A-terminal 6 force the user terminal 5 to hold the other call and connect to the A-terminal in speech communication. The instruction triggers the generation of the additional packet switched signal PS1 which causes the user terminal 5 to respond to the A-terminal 6 when PS1 has been received. The other call is put on hold. A message may be presented to the party of the other call that the call is put on hold.

In still another application, the present invention provides the network-induced "call hold" as described above. An A-terminal 6 calls the user terminal 5 of the present invention. The user terminal 5 is busy in another call to another terminal. The A-terminal 6 is privileged to "break in" in the ongoing call as explained before. In this case, no user interaction on the A-terminal is required. The busy signal is not transmitted to the party of the A-terminal 6. The additional packet switched signal PS1 may be sent directly with the call setup signal, or may be generated by a network service NS when a busy signal is detected for the user terminal 5. The user terminal 5 responds to the A-terminal 6, the other call is put on "hold". A message may be presented to the party of the other call that the call is put on "hold".

Although specific embodiments of the invention have been described, it should be understood that the embodiments are not intended to limit the invention. The invention may embody any further alternative, modification or equivalent, only limited by the scope of the appended claims.

The invention claimed is:

1. A user terminal for communication over a telecommunications network, the user terminal comprising:
a circuit-switched (CS) telephony device configured to receive and transmit CS-based telephony signals over a circuit-switched bearer service, wherein the CS telephony device receives a CS-alert signal from the network for an incoming call, wherein the CS telephony device derives from the CS-alert signal that an associated packet-switched (PS) signal is to be expected within a predetermined interval of time following receipt of the CS-alert signal, the CS telephony device being further configured to postpone generation of a call-received alarm for a user during the predetermined interval of time;
a PS data processing device configured to receive over a packet-switched bearer service, the associated PS signal within the predetermined interval of time following receipt of the CS-alert signal by the CS telephony device, wherein the PS signal includes a request that the user terminal automatically answer the incoming call;
wherein, in response to the request, the PS data processing device is configured to pass a control signal to the CS telephony device causing the CS telephony device to switch to an automatic answering mode; and
wherein, in response to the control signal, the CS telephony device is configured to transmit a CS-answer signal to the network without input from the user.

2. The user terminal according to claim 1, wherein the CS-telephony device includes a finite state machine which, in response to the PS signal, is configured to change a state of the user terminal to an active state for the incoming call, causing the user terminal to transmit the CS-answer signal.

3. The user terminal according to claim 2, wherein the PS data processing device comprises:

a processing application for processing the PS signal, the processing application being capable of deriving the request that the user terminal automatically answer the incoming call;

wherein an output of the processing application is connected to an input of the finite state machine for transmitting the control signal to the finite state machine; and wherein the finite state machine is configured to receive the control signal and to change the user terminal's state in response to the received control signal.

4. The user terminal according to claim 3, wherein the control signal also includes a hold signal for causing the finite state machine to change an active state of another ongoing call to a hold state and to put the incoming call into the active state.

5. A user terminal for communication over a telecommunications network, the user terminal comprising:

a circuit-switched (CS) telephony device configured to receive and transmit CS-based telephony signals over a circuit-switched bearer service, wherein the CS telephony device receives a CS-alert signal from the network for an incoming call;

wherein the CS-telephony based device is further configured to receive from the network, an additional CS signal including a request that the user terminal automatically answer the incoming call; and wherein, in response to the additional CS signal, the CS telephony device is configured to transmit a CS-answer signal to the network without input from a user.

6. The user terminal according to claim 5, further comprising:

a user interface; and a packet-switched (PS) data processing device configured to receive over a packet-switched bearer service, a PS invitation signal associated with the CS-alert signal, wherein the PS data processing device is configured to extract an invitation from the PS invitation signal and to forward the invitation to the user interface for presentation to a user;

wherein the user interface is configured to receive from the user, an indication that the call should be answered, and to forward the indication in a feedback signal to the PS data processing device;

wherein the PS data processing device is further configured to forward the feedback signal to the network, thereby causing the network to send the additional CS signal.

7. A network service on a telecommunications network, the network service comprising:

a circuit-switched (CS) bearer service for receiving and transmitting CS-based telephony signals;

wherein the CS bearer service is configured to send to a user terminal, a CS-alert signal of an incoming call to the user terminal; and wherein the CS bearer service is configured to send to the user terminal, an additional CS signal including a request that the user terminal answer the incoming call in response to the received CS-alert signal.

8. A network service on a telecommunications network, the network service comprising:

a circuit-switched (CS) bearer service for receiving and transmitting CS-based telephony signals; and a packet-switched (PS) bearer service for receiving and transmitting PS-based signals;

wherein:

the CS bearer service is configured to send a CS-alert signal of an incoming call to a user terminal;

the CS bearer service is configured to send an additional CS signal including a request that the user terminal automatically answer the incoming call;

the PS bearer service is configured to send to the user terminal, a PS invitation signal associated with the CS-alert signal;

the PS bearer service is configured to receive a feedback signal from the user terminal indicating the call should be answered; and the PS bearer service is configured to forward the feedback signal to the CS bearer service, thereby causing the CS bearer service to send the additional CS signal.

9. A call initiating terminal for communication over a telecommunications network, the call initiating terminal comprising:

a circuit-switched (CS) telephony device for processing CS-based telephony signals, the CS-based telephony signals being received and transmitted over a CS bearer service, wherein the CS telephony device transmits a CS call-setup signal to the network to set up an outgoing call to a user terminal; and wherein the CS telephony device is configured to transmit an additional CS signal over the CS bearer service within a predetermined interval of time following the CS call-setup signal, wherein the additional CS signal is associated with the transmitted CS call-setup signal and includes information causing the user terminal to switch to an automatic answering mode and to transmit a CS-answer signal to the network in response to the additional CS signal.

10. A method for communication over a telecommunications network, the method comprising:

receiving and transmitting by a user terminal, circuit-switched (CS)-based telephony signals over a CS bearer service, wherein the user terminal receives a CS-alert signal from the network for an incoming call;

receiving by the user terminal, an additional CS signal including a request that the user terminal automatically answer the incoming call; and in response to the additional CS signal, switching the user terminal to an automatic answering mode and transmitting a CS-answer signal to the network without input from a user.

11. The method according to claim 10, wherein the step of switching the user terminal to an automatic answering mode includes changing by a finite state machine in the user terminal, a state for the incoming call to an active state.

12. The method according to claim 10, further comprising:

receiving by the user terminal, a packet-switched invitation signal associated with the CS-alert signal;

extracting an invitation from the PS invitation signal and presenting the invitation to a user;

receiving from the user, an indication that the call should be answered; and forwarding the feedback signal to the network, thereby causing the network to send the additional CS signal.

* * * * *

UNITED STATES PATENT AND TRADEMARK OFFICE
CERTIFICATE OF CORRECTION

PATENT NO. : 9,094,502 B2  
APPLICATION NO. : 13/290371  
DATED : July 28, 2015  
INVENTOR(S) : Hartog et al.

Page 1 of 1

It is certified that error appears in the above-identified patent and that said Letters Patent is hereby corrected as shown below:

On the Title Page, in Item (75), Under "Inventors", in Column 1, Line 4, delete "Youngtongdong (KR)" and insert -- Yeongtong-gu (KR) --, therefor.

In the Specification

In Column 1, Line 7, delete "of co-pending" and insert -- of --, therefor.

Signed and Sealed this  
Fifth Day of January, 2016

Michelle K. Lee  
*Director of the United States Patent and Trademark Office*